(12) United States Patent
Zenzen et al.

(10) Patent No.: US 9,360,066 B2
(45) Date of Patent: Jun. 7, 2016

(54) METHOD FOR PRODUCING A BRAKE CARRIER FOR A DISC BRAKE AND BRAKE CARRIER FOR A DISC BRAKE

(75) Inventors: Guido Zenzen, Macken (DE); Marco Becker, Oberdürenbach (DE); Florian Rössinger, Neuwied (DE); Jochen Becker, Neuwied (DE); Hans-Ulrich Seuser, Neuwied (DE); Sabine Seuser, legal representative, Neuwied (DE); Christoph Seuser, legal representative, Neuwied (DE); Martin Seuser, legal representative, Neuwied (DE); Christina Bayer, legal representative, Neuwied (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/111,062

(22) PCT Filed: Apr. 5, 2012

(86) PCT No.: PCT/EP2012/001526
§ 371 (c)(1),
(2), (4) Date: Jan. 31, 2014

(87) PCT Pub. No.: WO2012/139738
PCT Pub. Date: Oct. 18, 2012

(65) Prior Publication Data
US 2014/0151165 A1 Jun. 5, 2014

(30) Foreign Application Priority Data
Apr. 13, 2011 (DE) .......................... 10 2011 016 928

(51) Int. Cl.
*F16D 65/095* (2006.01)
*F16D 65/00* (2006.01)
(Continued)

(52) U.S. Cl.
CPC ............ *F16D 65/0068* (2013.01); *B22D 25/02* (2013.01); *B23P 15/18* (2013.01); *F16D 2055/0008* (2013.01); *F16D 2200/003* (2013.01); *F16D 2250/0007* (2013.01)

(58) Field of Classification Search
CPC .................... F16D 2055/0008; F16D 65/0068; F16D 2250/0007; F16D 2250/003
See application file for complete search history.

(56) References Cited

U.S. PATENT DOCUMENTS 5,518,062 A * 5/1996 Kobayashi et al. ............ 164/137
6,047,795 A * 4/2000 Kobayashi et al. ........ 188/73.45
(Continued)

FOREIGN PATENT DOCUMENTS

DE 8806274 U1 9/1989
DE 4126294 A1 2/1993
(Continued)

OTHER PUBLICATIONS

International Search Report for PCT/EP2012/001526 dated Jun. 29, 2012.

*Primary Examiner* — Bradley King
(74) *Attorney, Agent, or Firm* — MacMillan, Sobanski & Todd, LLC

(57) ABSTRACT

In a method for producing a brake carrier for a disc brake of a vehicle braking system, wherein the brake carrier has at least one guiding shaft for guiding a brake lining in a guiding direction in relation to a receiving region for a brake disc, first a brake carrier blank is produced in a casting step and then the brake carrier blank is reworked. In the casting step, the brake carrier blank forms two converging tapers, facing the receiving region, in the region in which the guiding shaft is formed and, during the reworking, material is removed in the region of the tapers to produce the at least one guiding shaft, with the effect that the receiving region for the brake disc has a predetermined clear width transversely in relation to the guiding direction.

9 Claims, 5 Drawing Sheets

(51) Int. Cl.
  *B23P 15/18* (2006.01)
  *B22D 25/02* (2006.01)
  *F16D 55/00* (2006.01)

(56) References Cited

U.S. PATENT DOCUMENTS

| | | | |
|---|---|---|---|
| 2004/0060781 A1* | 4/2004 | Goebel et al. | 188/73.31 |
| 2007/0267256 A1* | 11/2007 | Blatt et al. | 188/73.31 |
| 2008/0067015 A1* | 3/2008 | Thomas et al. | 188/73.31 |
| 2009/0008194 A1 | 1/2009 | Redemann et al. | |
| 2012/0067678 A1* | 3/2012 | Andrews et al. | 188/206 A |
| 2012/0085597 A1* | 4/2012 | Narayanan | 188/72.1 |

FOREIGN PATENT DOCUMENTS

| | | |
|---|---|---|
| DE | 4318749 A1 | 12/1994 |
| DE | 102004002571 A1 | 12/2004 |
| DE | 102008023101 A1 | 11/2009 |
| WO | 2006042697 A1 | 4/2006 |

\* cited by examiner

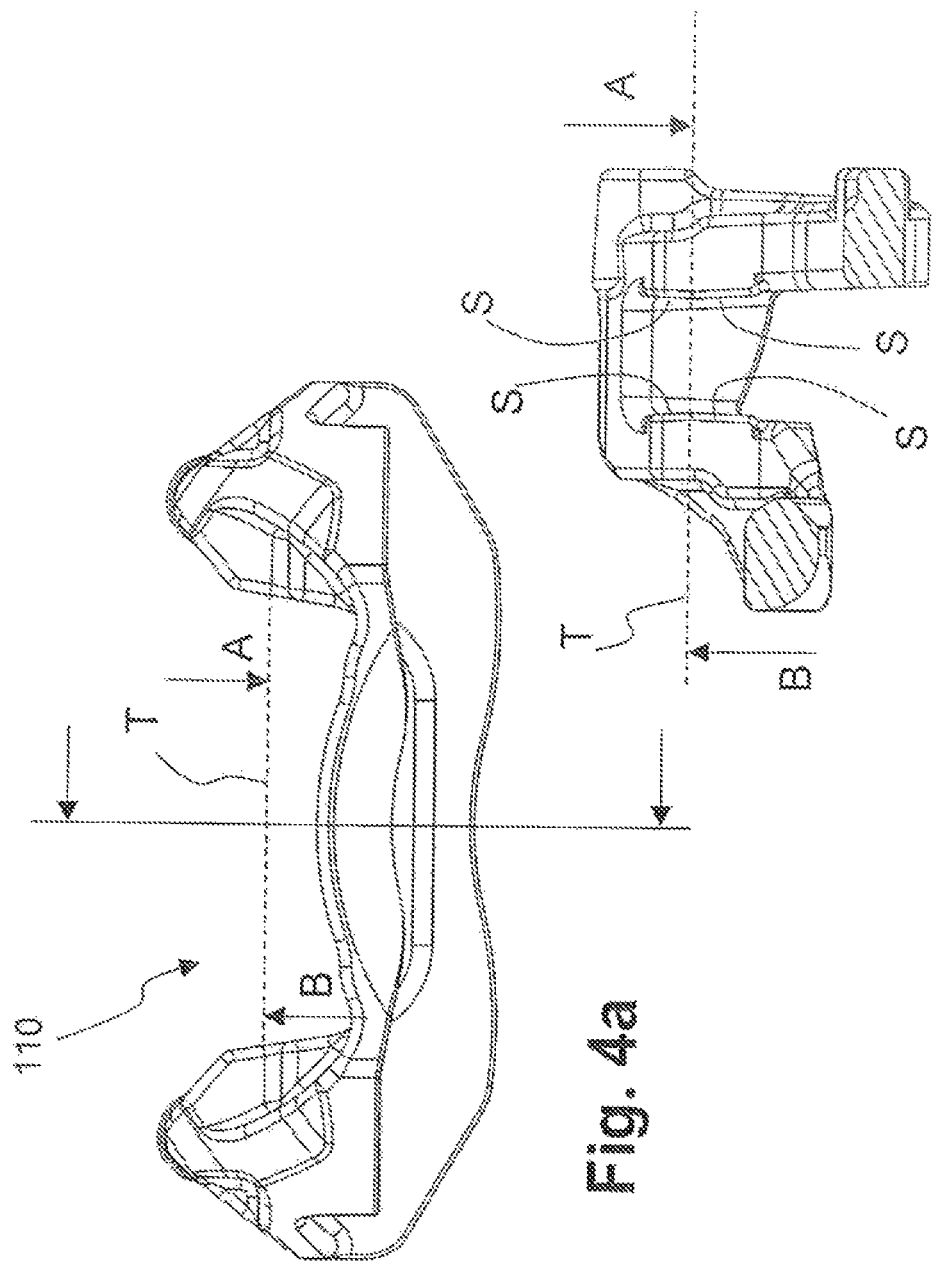

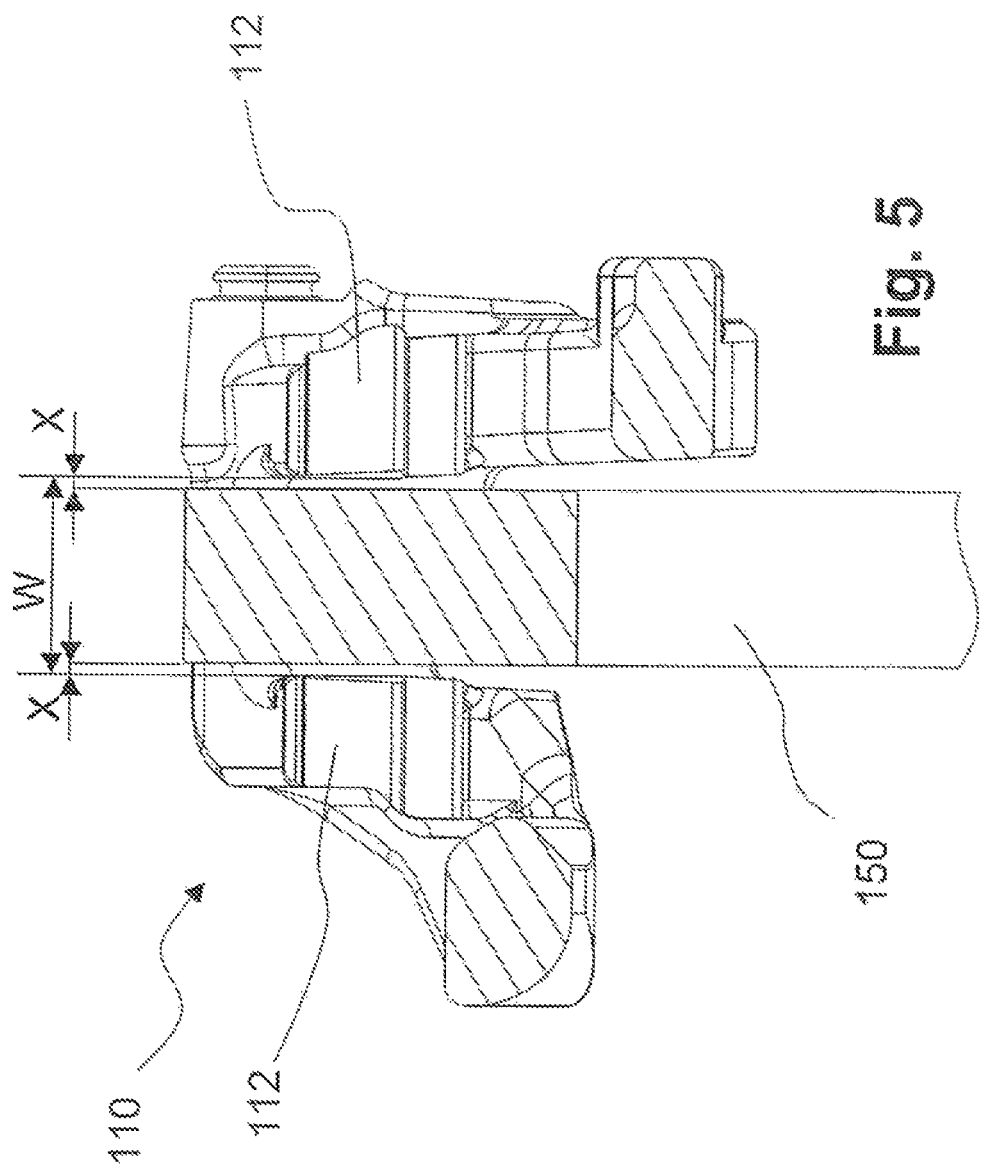

METHOD FOR PRODUCING A BRAKE CARRIER FOR A DISC BRAKE AND BRAKE CARRIER FOR A DISC BRAKE

CROSS-REFERENCE TO RELATED APPLICATIONS

This application is a national stage of International Application No. PCT/EP2012/001526 filed Apr. 5, 2012, the disclosures of which are incorporated herein by reference in entirety, and which claimed priority to German Patent Application No. DE 10 2011 016 928.8 filed Apr. 13, 2011, the disclosures of which are incorporated herein by reference in entirety.

BACKGROUND OF THE INVENTION

The present invention relates to a method for manufacturing a brake carrier for a disc brake of a vehicle brake system, wherein the brake carrier has at least one guiding recess for guiding a brake pad in a guiding direction relative to a receiving region for a brake disc, wherein the method comprises the steps of manufacturing a brake carrier blank in a casting step and finishing the brake carrier blank by removing material for producing the at least one guiding recess. The present invention further relates to a brake carrier and to a disc brake having such a brake carrier.

Brake carriers of this kind in disc brakes are known from the prior art. In conventional brake carriers, in one machining step first the guiding recess is formed and subsequently, in a following machining step, the receiving region for the brake disc is machined in order to bring a disc clearance to a predetermined dimension. The forming of the guiding recess is generally effected by a chip-removal machining step, in which material is removed from the cast blank transversely to the receiving region of the brake disc, for example by means of a milling tool. The clear width of the receiving region for the brake disc which defines the disc clearance for a brake disc, i.e. the distance from one side of the brake carrier to the opposite side of the brake carrier across the receiving region of the brake disc, is likewise effected in an additional chip-removal machining step. In this step, a milling tool is moved in the receiving region along the inner region of the brake carrier. The disc clearance specifies a distance from one side of the brake carrier or the wall of the brake carrier to the opposite side face of the brake disc. The disc clearance must be chosen such that, in operation, a rotating brake disc which projects into the inner region of the brake carrier does not touch the brake carrier under all operating conditions.

In particular, a so-called disc runout and a lateral distortion of the brake disc under high thermal load, the so-called coning, must be taken into account and accordingly free spaces (disc clearance) provided on the brake carrier. Furthermore, this disc clearance must always be small enough to prevent, for example in the event of the actual friction pad of the brake pads being completely worn, the brake pads from slipping into the disc clearance during braking, since this would result in total failure of the brake. This means that the disc clearance should be less than the thickness of a backplate for brake pads. For safety, even 10% wear of the metal backplate of the brake pads must still not result in such slipping-in.

Since the disc clearance is set in the prior art by additional machining after a brake carrier has been manufactured as an unfinished cast part and after the guiding recesses have been made, disadvantages arise from the point of view of production. The additional machining of the receiving region for the brake disc for the purpose of setting the disc clearance is disadvantageous because any additional machining, besides a longer machining time, also increases the production costs.

The document DE 41 26 194 A1 discloses a fixed-caliper brake with a brake disc, in which supporting surfaces for the brake pads are machined in one milling operation to simplify the machining. In this case, the disc clearance can be additionally set in this operation, since the supporting surfaces project into the inner space of the brake carrier and the distance between two supporting surfaces lying opposite one another across the inner space defines the clear width. If the teaching from document DE 41 26 194 A1 is transferred to a brake caliper mounted in a floating manner on a brake carrier, however, guiding recesses have to be additionally provided, so that a further machining step is required, as described at the outset.

BRIEF SUMMARY OF THE INVENTION

It is a feature of the present invention to specify a method for manufacturing a brake carrier for a disc brake of the kind mentioned at the outset which requires less time and cost than the prior art. In addition, it is a feature to specify a brake carrier for a disc brake which can be manufactured in less time and at lower cost, and a disc brake for a vehicle brake system.

This feature is achieved by a method for manufacturing a brake carrier for a disc brake having the features described at the outset, wherein the brake carrier blank is formed in the casting step, in the region in which the guiding recess is formed, with two converging shaped chamfers facing the receiving region, and during finishing for producing the at least one guiding recess material is removed in the region of the shaped chamfers such that the receiving region for the brake disc has a predetermined clear width transversely to the guiding direction. According to the invention, the guiding recess for guiding a brake pad in the guiding direction relative to a receiving region for a brake disc is formed in a single machining step and at the same time the predetermined clear width in the receiving region for the brake disc transversely to the guiding direction is dimensioned.

Through the two converging shaped chamfers convexly facing the receiving region, it is possible to achieve different widths of the receiving region, depending on the position of the guiding recess and/or the configuration of the two converging shaped chamfers facing the receiving region. Clear widths of the receiving region can thereby be produced, as required, for different brake discs. Moreover, a predetermined clear width can also be achieved for different positions of the guiding recess by an adapted shaping of the converging shaped chamfers. The machining step on manufacturing brake carriers which is described in connection with the prior art is dispensed with by such a method, with the result that the machining time can be reduced and production costs saved. In addition, further machining steps, such as the resetting of the brake carrier and the subsequent lateral machining to produce the clear width and the disc clearance, are dispensed with.

An at least two-part casting mould can be used in the casting step, the mould halves of which adjoin one another in a mould parting plane, wherein the mould parting plane is positioned in the region in which the at least one guiding recess is formed on the brake carrier. By using an at least two-part casting mould and positioning the mould parting plane in the region in which the at least one guiding recess is formed on the brake carrier, the formation of converging shaped chamfers convexly facing the receiving region is simplified, it being possible for the shaped chamfers thereby to have diverse shapes. In addition, the shaped chamfers can be of "bulge-like" or "bellied" configuration, and also have angular shapes tapering with a greater or lesser sharpness.

The mould parting plane can run substantially centrally through the region in which the at least one guiding recess is formed on the brake carrier. On both sides of the mould parting plane in each case one shaped chamfer can be arranged, so that each of the at least two mould halves forms a shaped chamfer, thereby simplifying the manufacture of the brake carrier blank in the casting step, in particular the removal of the blank from the mould.

The shaped chamfers can have substantially the same relative angle of inclination with respect to the mould parting plane, so that the manufacture of the brake carrier blank in the casting step is thereby also simplified and also the position or location of the guiding recess can be variable. Through the same relative angle of inclination with respect to the mould parting plane, a symmetrical design of the mould parting planes results. In this case, it can be provided that after the removal of material in the region of the guiding recess, from the transition of the guiding recess into the receiving region, on both sides of the guiding recess the remaining sections of the shaped chamfers not removed project substantially the same distance into the guiding recess.

The shaped chamfers can, however, also have different relative angles of inclination with respect to the mould parting plane, thereby enabling different widths of the receiving region for the brake disc to be achieved, depending on the position or location of the guiding recess.

The brake carrier blank can be produced from aluminium, an aluminium alloy or from spheroidal graphite cast iron material.

The removal of material to produce the at least one guiding recess can be effected in a chip-removal machining step. Preferably, the chip-removal machining step is effected by milling. However, other chip-removal machining methods, such as for example broaching or grinding, can also be employed.

The removal of material can preferably be effected merely in the guiding direction, in which case the manufacture of the brake carrier is substantially simplified and costs are reduced.

The invention further relates to a brake carrier for a disc brake of a vehicle brake system, in particular manufactured by a method of the above-described kind, wherein the brake carrier has at least one guiding recess for guiding a brake pad in a guiding direction relative to a receiving region for a brake disc, and wherein the brake carrier consists of a brake carrier blank which is manufactured in a casting step and of which at least one guiding recess is produced by removing material of the brake carrier blank. The brake carrier blank has, in the region in which the guiding recess is formed, two converging shaped chamfers preferably convexly facing the receiving region which, after the production of the at least one guiding recess, define the receiving region for the brake discs in a predetermined clear width transversely to the guiding direction. Such a brake carrier is more cost-effective to manufacture compared with brake carriers of the prior art, because it can be manufactured with fewer operations and therefore in a shorter machining time.

Such a brake carrier has at least one guiding recess which is formed from two converging shaped chamfers facing the receiving region, and which on account of these shaped chamfers can be additionally machined in the event of deviations of the width in the receiving region for the brake disc.

Advantageously, a disc brake for a vehicle brake system has such a brake carrier. This results in a more cost-effective brake system, which additionally has the above-mentioned advantages.

Each simplification of the method for manufacturing the brake carrier of the kind mentioned at the outset brings about a saving of time and reduces the costs involved in manufacturing brake carriers on a large scale. It is likewise possible, owing to the various configurations of the shaped chamfers, to produce corresponding clear widths and therefore also different or adapted disc clearances for a large number of brake discs.

Further aims, features, advantages and possible applications emerge from the following description of embodiments which are not to be understood as limiting, with reference to the associated drawings. All of the features described and/or pictorially represented constitute, by themselves or in any combination, the subject matter disclosed here, also irrespective of their grouping in the claims or those to which the latter refer back. The dimensions and proportions of the components shown in the figures are not necessarily to scale here. They may deviate from those illustrated, in embodiments to be implemented.

Other advantages of this invention will become apparent to those skilled in the art from the following detailed description of the preferred embodiments, when read in light of the accompanying drawings.

BRIEF DESCRIPTION OF THE SEVERAL VIEWS OF THE DRAWINGS

FIG. 4a shows a side view of a brake carrier blank;

FIG. 4b shows a sectional view of the brake carrier blank from FIG. 4a with two converging shaped chamfers facing the receiving region; and FIG. 5 shows a sectional view of a brake carrier with two guiding recesses and a brake disc arranged in the receiving region.

DETAILED DESCRIPTION OF THE INVENTION

Figure 1:
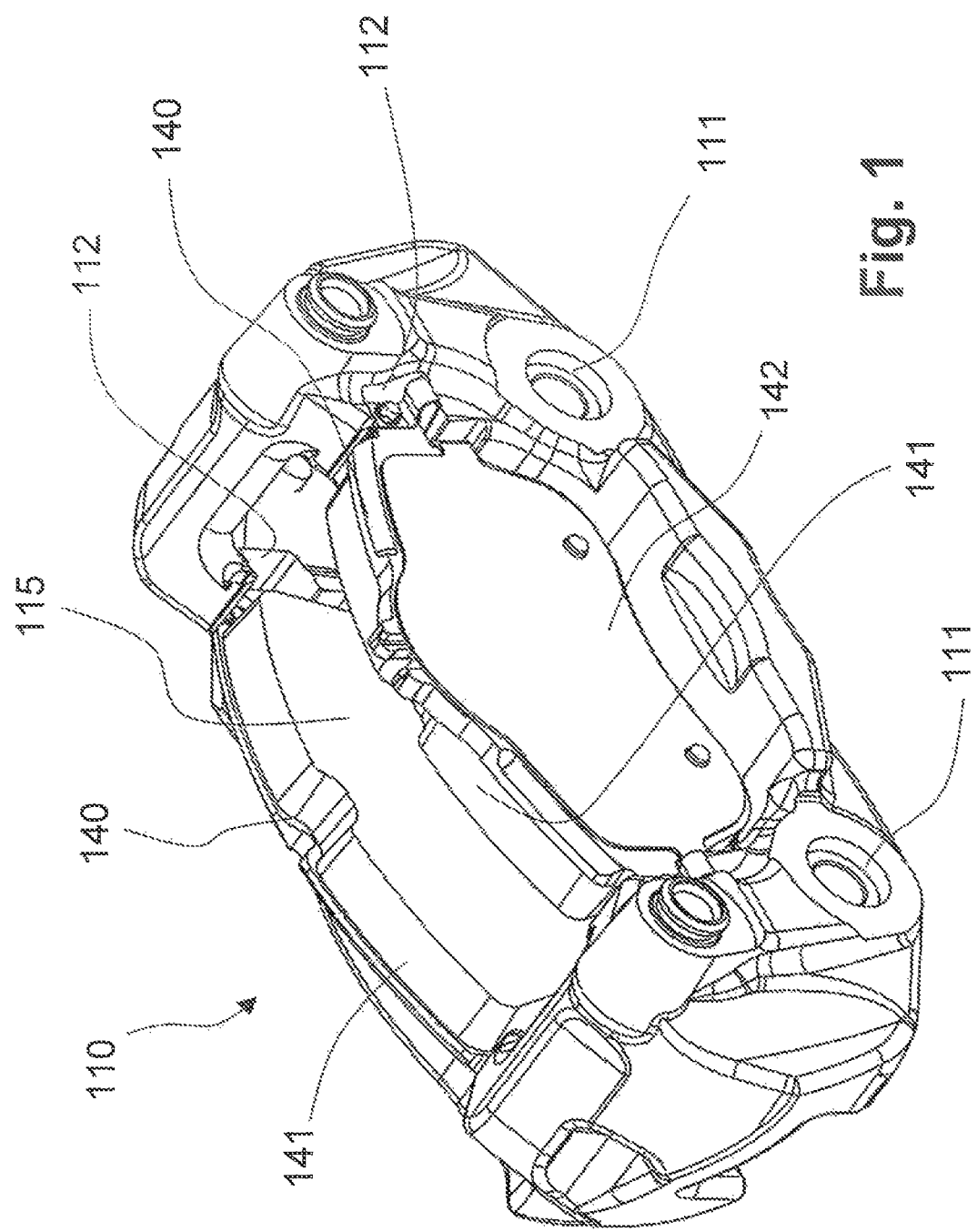
FIG. 1 shows a brake carrier with brake pads arranged in guiding recesses, in a perspective representation.

FIG. 1 shows a brake carrier 110 with two brake pads 140 guided in guiding recesses 112. The brake pads 140 have a friction pad 141 which is attached to a backplate 142. The brake carrier 110 has fastening openings 111, via which the brake carrier 110 can be firmly connected to a part of a vehicle. The attachment of the brake carrier 110 via the fastening openings 111 can be effected here via a screw connection. The brake carrier 110 in this embodiment has a total of four guiding recesses 112, in which the brake pads 140 are guided via projecting tongues of the backplate 142, only two of the four guiding recesses 112 being visible in FIG. 1.

In the guiding recesses 112, the brake pads 140 can be pushed in the direction towards an inner region 115 on actuation of the brake, so that the brake pads 140 are brought into engagement with a brake disc 150, not illustrated in FIG. 1. The inner region 115 comprises the receiving region for the brake disc 150, into which open the guiding recesses 112. The brake disc 150 is mounted between the two brake pads 140 in the receiving region about a rotation point, which is not illustrated in FIG. 1 and lies below the brake carrier 110 illustrated in FIG. 1.

The brake carrier 110 corresponds largely to the shape and design of a conventional brake carrier. All the components and design features of the brake carrier 110, as well as the components of a disc brake and a brake system of a vehicle, are therefore not described. The following description rather concentrates on the features essential to the invention.

Figure 2:
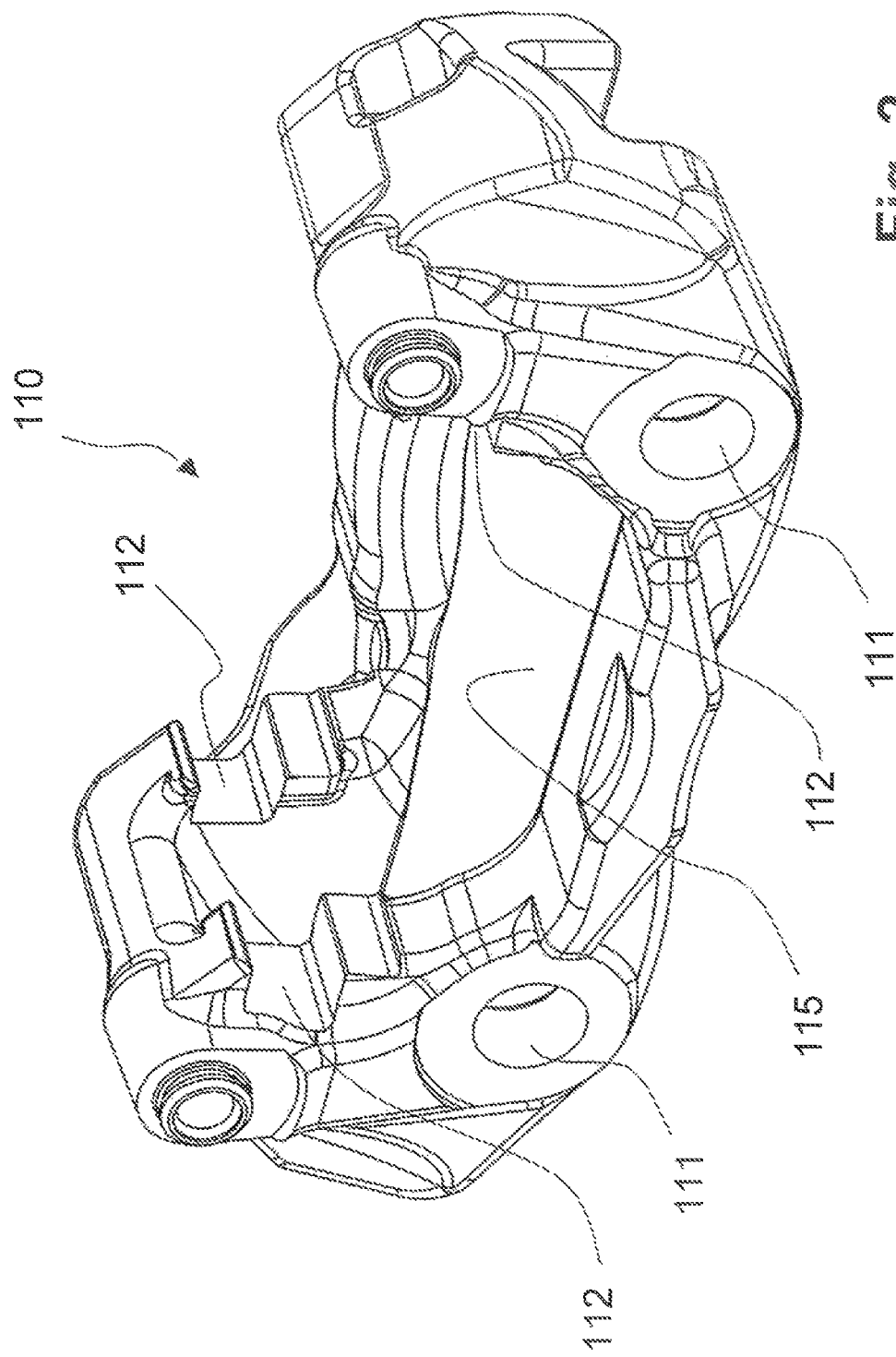
FIG. 2 shows the brake carrier according to FIG. 1 without brake pads with the guiding shafts formed, in a perspective representation.

FIG. 2 shows a brake carrier 110 with guiding recesses 112, only three of the total of four guiding recesses 112 being visible in FIG. 2. The guiding recesses 112 are arranged opposite, i.e. aligned in pairs, across the inner region 115 or the receiving region of the brake disc 150. The guiding recesses 112 are produced, for example, by milling or other chip-removal machining transversely to the direction of the longitudinal direction of the brake carrier 110. In doing so, the respectively opposite guiding recesses 112 are produced in one machining step owing to their aligned orientation, with for example the material removal being effected by moving a milling tool transversely to the receiving region of the brake disc 150 across the entire width of the brake carrier 110.

Figure 3:
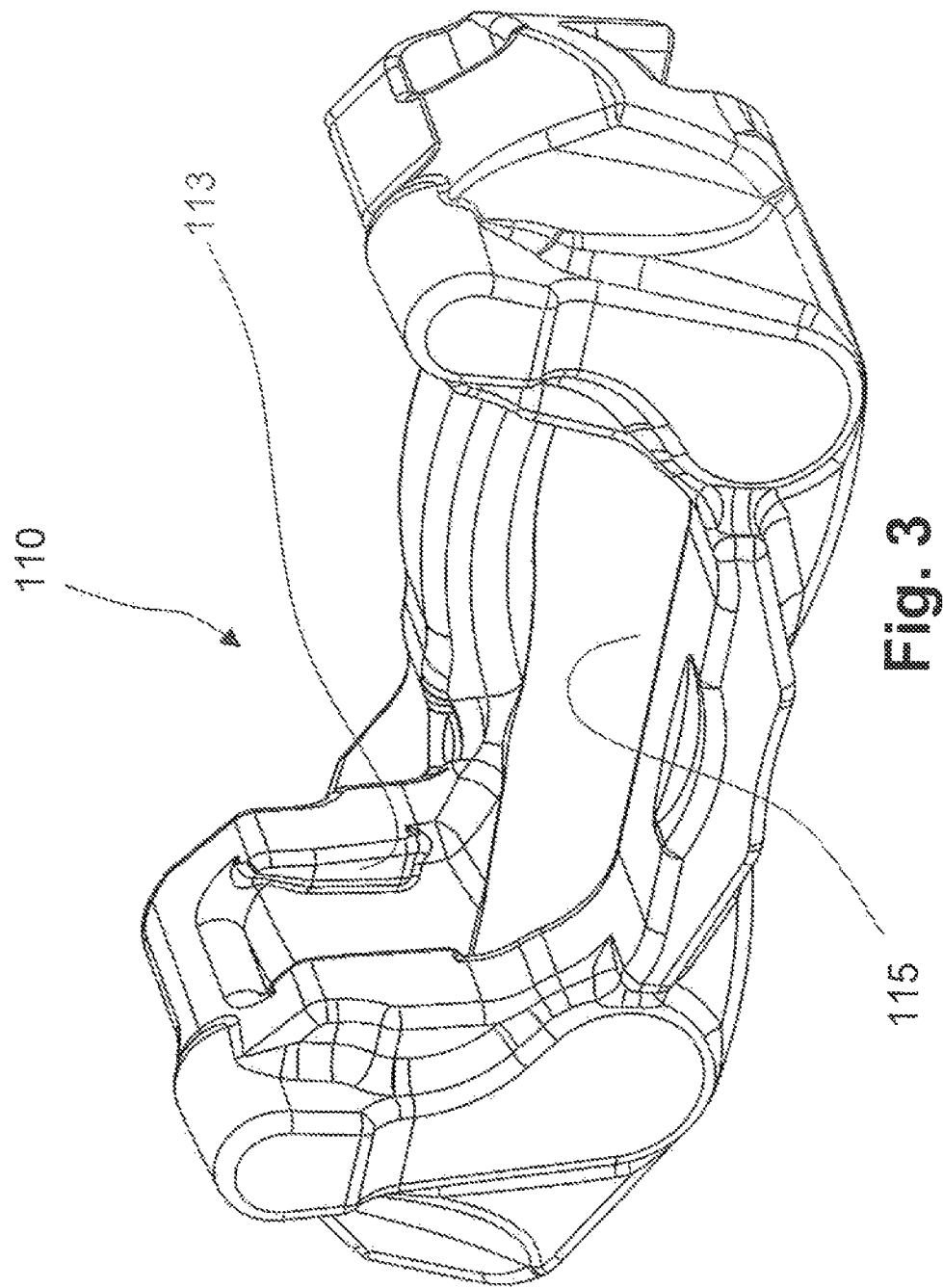
FIG. 3 shows a brake carrier blank after manufacturing by casting, with converging shaped chamfers facing the receiving region, in a perspective representation.

FIG. 3 shows a brake carrier blank after manufacture in a casting step, with a region 113 with shaped chamfers S being visible. The brake carrier blank is produced from aluminium. The brake carrier blank illustrated in FIG. 3 does not yet have any guiding recesses 112 and fastening openings 111. These are made in the brake carrier blank in subsequent machining steps.

The region 113 has a bulge-like section with two converging shaped chamfers S convexly facing the receiving region, which section extends into the inner region 115 of the brake carrier blank or into the receiving region for the brake disc 150 and, in the drawing starting from the centre, tapers both upwards and downwards and to the left and right. The brake carrier blank from FIG. 3 thus has four regions 113 with shaped chamfers S which are respectively opposite one another and project into the inner region 115 of the brake carrier blank or into the receiving region for the brake disc 150.

The shaped chamfers S can have various shapes, with mould halves A and B or other mould parts, which are used in the manufacture during the casting step and predetermine the shape of the brake carrier blank, being able to be formed such that a multiplicity of different regions 113 with two converging shaped chamfers S facing the receiving region for the brake disc 150 are formed.

FIG. 4a shows a side view of a brake carrier blank. In FIG. 4a a mould parting plane T is drawn with a broken line. Furthermore, FIG. 4a shows how the two mould halves A and B adjoin one another in the mould parting plane T. The mould halves A and B are, however, not shown in detail.

Alternatively, it is, however, also possible to displace the mould parting plane T parallel to the mould parting plane T illustrated in FIG. 4a or/and rotate it by a certain amount about an axis of rotation perpendicular to the plane of the drawing. The axis of rotation can be situated both inside the brake carrier blank and outside the brake carrier blank. It is, however, also possible to use several mould parts, with the result that the design possibilities regarding the shaped chamfers S are multiplied.

In FIG. 4a a section through the brake carrier blank is also illustrated as a continuous line. FIG. 4b shows the corresponding sectional view of the brake carrier blank from FIG. 4a. The mould parting plane T is again drawn with a broken line and indicates the region in which the two mould halves A and B adjoin one another while the casting step to form the brake carrier blank is carried out. The sectional view of FIG. 4b shows how the mould parting plane T runs through the region 113 with the shaped chamfers S in the receiving region for the brake disc 150.

FIG. 5 shows a sectional view of a brake carrier 110 after the guiding recesses 112 have been made in the brake carrier 110. Furthermore, a brake disc 150 is illustrated in the receiving region, which disc is spaced from the regions 113 of the shaped chamfers S on both sides by a distance X from these regions. The distance X denotes the disc clearance for the brake disc 150. The guiding recesses 112 are produced by removing material, during which a part of the shaped chamfers S provided in the blank is also removed by the material removal. As a result, a predetermined clear width W is set between the regions 113 of the shaped chamfers S. Depending on the geometry of the shaped chamfers S and the position of the guiding recesses 112, it is possible to achieve a predetermined clear width W adapted to the brake disc used by the removal of the material in the region. The setting of the clear width W is effected according to the present invention in a single machining step, since, through the removal of the material to produce the guiding recesses 112, the material removal in the region of the shaped chamfers S is also effected. The clear width W is determined in dependence on how much material remains in the region of the shaped chamfers S during the removal to produce the guiding recesses 112.

Furthermore, it is possible to choose special shapes of the shaped chamfers S, through which more accurate production tolerances can be met. For example, in the case of flat-tapering shaped chamfers S the variance of the clear width W in the receiving region is only small. In the case of shaped chamfers S which taper relatively sharply, a greater variance of the clear width W between the regions 113 of the shaped chamfers S in the receiving region can be achieved depending on the position and height of the guiding recesses 112. The invention thus opens up an advantageous way of simplifying the manufacture and saving costs with simple means, solely by suitable shaping in the region of the shaped chamfers S on the brake carrier blank.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for manufacturing a brake carrier for a disc brake of a vehicle brake system, wherein the brake carrier has at least one guiding recess for guiding a brake pad in a guiding direction relative to a receiving region for a brake disc, wherein the method comprises the steps:

manufacturing a brake carrier blank in a casting step, and
finishing the brake carrier blank by a single machining step which removes material for producing the at least one guiding recess, wherein the brake carrier blank is formed in the casting step, in a region in which the at least one guiding recess is formed, with two converging shaped chamfers facing the receiving region, and that during the single machining step which removes material for producing the at least one guiding recess material is also removed from the shaped chamfers such that the receiving region for the brake disc has a predetermined clear width.

2. The method according to claim 1,
wherein an at least two-part casting mould is used in the casting step, the mould halves of which adjoin one another in a mould parting plane, wherein the mould parting plane is positioned in the region in which the at least one guiding recess is formed on the brake carrier.

3. The method according to claim 2,
wherein the mould parting plane runs substantially centrally through the region in which the at least one guiding recess is formed on the brake carrier.

4. The method according to claim 2,
wherein on both sides of the mould parting plane in each case at least one shaped chamfers is arranged.

5. The method according to claim 2,
wherein the shaped chamfers have substantially the same relative angle of inclination with respect to the mould parting plane.

6. The method according to claim 2,
wherein the shaped chamfers have different relative angles of inclination with respect to the mould parting plane.

7. The method according to one claim 1,
wherein the brake carrier blank is produced from aluminium, an aluminium alloy or from spheroidal graphite cast iron material.

8. The method according to claim 1,
wherein the removal of material to produce the at least one guiding recess is effected in a chip-removal machining step.

9. The method according to claim 1,
wherein the removal of material is effected in the guiding direction.

* * * * *